Patented Jan. 23, 1940

2,188,092

UNITED STATES PATENT OFFICE 2,188,092

REMOVAL AND RECOVERY OF LAMINARINE FROM SEAWEED

Victor Charles Emile Le Gloahec, Rockland, Maine, and John Robert Herter, New York, N. Y., assignors to Algin Corporation of America, New York, N. Y., a corporation of Delaware No Drawing. Application January 20, 1938, Serial No. 185,838. In France January 11, 1934

7 Claims. (Cl. 260—210)

This invention relates to the recovery of laminarine from seaweed.

An object of the present invention is the treatment of suitable seaweeds such as laminaria, pheophyceae, macrocystis, nereocystis, and the like in order to readily recover therefrom laminarine and in order to recover the laminarine freed from contaminating impurities.

The seaweeds above referred to contain a great number of bodies, to wit: salts, most of which are salts of alkaline metals and/or metalloids (e. g., sodium, potassium, ammonium, magnesium) and various organic matters, the most important of which are: algin, laminarine, mannitol, and algulose (seaweed cellulose).

The recovery of alginous material from seaweed is described in our copending application Serial No. 1,076, filed January 9, 1935 (Patent 2,128,551, issued August 30, 1938). The present application is a continuation-in-part of said application.

In the practice of this invention the laminarine is extracted from seaweed by taking advantage of the fact that the laminarine remains soluble in water in the presence of alkaline earth metal salts, contrary to what takes place for alginous material. This step is used in combination with a subsequent precipitation step, this particular extraction step being important in enabling the laminarine to be recovered by precipitation uncontaminated with alginous material and likewise separated from algulose.

The following is an illustration of the use of a solution of an alkaline earth metal salt solution to extract laminarine from seaweed prior to the precipitation of the laminarine.

In order to obtain a good elimination of laminarine, we preferably, for one thousand parts in weight of dried seaweeds, still containing about thirty per cent. of moisture, make use of from 2.2 to 2.8 parts by weight of calcium chloride (anhydrous) or from 4.9 to 6.2 parts of barium chloride (crystallized with two molecules of water). About 3,000 parts by volume of solution is used for exhausting the amount of seaweeds above mentioned by dissolving the above-mentioned laminarine. This solution therefore contains from 0.8 to 1% of anhydrous calcium chloride, for example. If the process is carried out with seaweeds as freshly taken from water, the proportion of alkaline-earth salt is preferably reduced about five times. The treatment may be carried out either in the hot state or in the cold state. However, we have found that it is advantageous to operate in the cold state.

The seaweeds are then washed with soft water, which removes the excess of alkaline-earth salts and at the same time removes the remainder of the laminarine and the salts of the seaweeds, and also mannitol. This operation of washing with soft water is stopped, merely for the sake of economy, when the exhaustion waters contain only ½% approximately of soluble matters.

In order to facilitate the subsequent recovery of the soluble products removed from the seaweeds that are treated, it is advisable to carry out the treatment with solutions of alkaline-earth salts and the subsequent washing with soft water in a systemmatic manner, according to known methods, in order to render the washing waters as rich as possible. The treatment of these waters to recover the alkaline earths and other materials is indicated hereinbelow. If the wash waters are re-used, it is then necessary to add a desired amount of alkaline-earth salts thereto before they again come into contact with seaweeds that have not been exhausted.

The algulose and alginous material comprised in the residue from which the laminarine has been extracted may be treated for the recovery of the alginous material as described in our application Serial No. 1,076 (Patent No. 2,128,551) above referred to.

The liquids resulting from the treatment whereby the laminarine is extracted from the seaweeds is treated to precipitate the laminarine. The laminarine is then separated from the mother liquor and is recovered in a precipitated or coagulated form. The following examples illustrate the precipitation of the laminarine.

Laminarine may be precipitated by means of alcohol. In order to obtain substantially complete precipitation of the laminarine, the alcohol should be added until the alcohol in the mixture has a concentration of at least about 85%, although precipitation begins to occur when the alcohol concentration is substantially less than 85%, e. g., about 70%. The amount of alcohol required to effect the precipitation of the laminarine can be materially reduced by concentrating the aqueous solution of laminarine extracted from the seaweed prior to the precipitation step. After the precipitation, the precipitate is separated from the mother liquor. The precipitate that is obtained may be purified by successively dissolving it in alkaline earth solutions and again precipitating it by means of alcohol. The alcohol that is utilized for these operations may be subsequently recovered. It is advantageous to treat the seaweeds by means of barium or strontium salts, because the precipitation of laminarine by means of alcohol takes place under better conditions and with a better yield.

It is also possible to precipitate laminarine by means of subacetate of lead in an alkaline medium. For example, the aqueous solution may be made alkaline by adding caustic soda to the solution until there is about 5 to 10% of the caustic soda in the solution. About 10% of subacetate of lead on the weight of laminarine in the solution is used to precipitate the laminarine with good yield. Other alkalis than caustic soda may also be used. In this case also it is desirable to concentrate the aqueous solution of laminarine before the laminarine is precipitated. After the precipitation, the precipitate is separated from the mother liquor.

By the foregoing method steps laminarine can be readily extracted from seaweed and recovered in a relatively pure condition. The initial washing with an alkaline earth salt solution effects a separation of the laminarine from alginous material and from algulose and affords a solution which, while containing substances such as mannitol and soluble mineral matters, enables the laminarine to be precipitated therefrom in a relatively pure form. Laminarine recovered from seaweed and substantially free from alginous material is a new product coming within the scope of this invention.

If desired, the solution of laminarine produced by washing the seaweed with an alkaline earth salt solution may be purified prior to the precipitation of the laminarine, by adding an alkali metal carbonate to the solution to precipitate alkaline earth metal carbonate and separating the precipitated alkaline earth metal carbonate from the solution. The precipitate of alkaline earth carbonate tends to carry down impurities with it which are separated from the solution upon the removal of the precipitated alkaline earth metal carbonate from the solution. The solution of alkaline earth metal salt used in washing the seaweed contains any soluble iodine compounds in the seaweed in addition to laminarine. These iodine compounds may be removed as, for example, by the method described in our copending application executed on January 18, 1938, for Iodine recovery, Serial No. 185,810, filed January 20, 1938, before or after the precipitation of the laminarine, as described herein.

While this invention has been described in connection with certain specific examples, it is to be understood that this has been done merely for the purpose of illustrating the practice of this invention and that the scope of this invention is to be limited only by the language of the following claims.

We claim:
1. In a method of treating seaweed, the steps comprising washing the seaweed with alkaline earth metal salt solution to dissolve laminarine, separating dissolved laminarine from undissolved material, precipitating the laminarine by adding a precipitant for laminarine to the solution and separating precipitated laminarine from the residual liquid.

2. In a method of treating seaweed, the steps comprising washing the seaweed with alkaline earth metal salt solution to dissolve laminarine, separating dissolved laminarine from undissolved material, precipitating the laminarine by adding alcohol to the solution and separating precipitated laminarine from the residual liquid.

3. In a method of treating seaweed, the steps comprising washing the seaweed with alkaline earth metal salt solution to dissolve laminarine, separating dissolved laminarine from undissolved material, precipitating the laminarine by adding subacetate of lead and an alkaline material to the solution and separating precipitated laminarine from the residual liquid.

4. In a method of treating seaweed the steps according to claim 1 wherein the alkaline earth metal salt solution is a solution of a salt selected from the salts barium and strontium.

5. In a method of treating seaweed, the steps according to claim 1 and wherein the solution containing laminarine is concentrated prior to the precipitation step.

6. In a method of treating seaweed, the steps comprising washing the seaweed with an alkaline earth metal salt solution, separating the dissolved laminarine from undissolved material thereby obtaining a solution containing laminarine, adding an alkali metal carbonate to the solution to precipitate alkaline earth metal carbonate in the solution, and separating the alkaline earth metal carbonate from the solution.

7. In a method of treating seaweed, the steps comprising washing the seaweed with an alkaline earth metal salt solution, separating the dissolved laminarine from undissolved material thereby obtaining a solution containing laminarine, adding an alkali metal carbonate to the solution to precipitate alkaline earth metal carbonate in the solution, separating the alkaline earth metal carbonate from the solution, precipitating laminarine in the solution by adding a precipitant to the solution and separating precipitated laminarine from the residual liquid.

VICTOR CHARLES EMILE LE GLOAHEC.
JOHN ROBERT HERTER.